United States Patent
James (10) Patent No.: US 9,832,514 B2
(45) Date of Patent: Nov. 28, 2017

(54) RECEIVER OF TELEVISION AND/OR RADIO SIGNALS, CONFIGURED TO PREPARE ACCESS TO CONTENT INCLUDED IN SAID TELEVISION AND/OR RADIO SIGNALS BASED ON THE GEOGRAPHICAL LOCATION OF SAID RECEIVER

(71) Applicant: Saronikos Trading and Services, Unipessoal Lda, Funchal, Madeira (PT)

(72) Inventor: Robert James, Hatfield (GB)

(73) Assignee: SARONIKOS TRADING AND SERVICES, UNIPESSOAL LDA, Madeira (PT)

( * ) Notice: Subject to any disclaimer, the term of this patent is extended or adjusted under 35 U.S.C. 154(b) by 0 days.

(21) Appl. No.: 15/111,859

(22) PCT Filed: Jan. 17, 2014

(86) PCT No.: PCT/EP2014/050871
§ 371 (c)(1),
(2) Date: Jul. 15, 2016

(87) PCT Pub. No.: WO2015/106818
PCT Pub. Date: Jul. 23, 2015

(65) Prior Publication Data
US 2016/0337685 A1 Nov. 17, 2016

(51) Int. Cl.
*H04N 21/426* (2011.01)
*H04N 5/50* (2006.01)
(Continued)

(52) U.S. Cl.
CPC ........ *H04N 21/4263* (2013.01); *H04H 60/42* (2013.01); *H04H 60/51* (2013.01);
(Continued)

(58) Field of Classification Search
CPC combination set(s) only.
See application file for complete search history.

(56) References Cited

U.S. PATENT DOCUMENTS

| 2005/0264700 A1 | 12/2005 | Matsuo |
| 2010/0265400 A1 | 10/2010 | Heider |
| 2011/0096243 A1 | 4/2011 | Casagrande |
| 2015/0181282 A1* | 6/2015 | Majid ............... H04N 21/4384 725/38 |

FOREIGN PATENT DOCUMENTS

| FR | 2 685 845 | 7/1993 |
| WO | 2005/041064 A1 | 5/2005 |
| WO | 2007/001265 A1 | 1/2007 |

OTHER PUBLICATIONS

Written Opinion and an International Search Report for Application No. PCT/EP2014/050871 dated Oct. 6, 2014.
(Continued)

*Primary Examiner* — Mulugeta Mengesha
(74) *Attorney, Agent, or Firm* — Workman Nydegger (57) ABSTRACT

A receiver of radio and/or television signals, where the signals are transmitted via radio by transmitters and are received by said receiver, including:
- a means for receiving signals via radio that, through tuning information, is configurable for reception of content of the received radio and/or television signals;
- a memory means containing at least geographic transmission information, which includes geographical areas of coverage of the transmitters that transmit the signals received by the reception means, wherein the geographical transmission information is comparable with the tuning information; and
- a central computing unit configured to determine the geographical location of the receiver according to the geographical transmission information and the tuning information, the central computing unit also being configured to prepare access to the tuning information (Continued)

based on the geographical location of the receiver in order to organize access to the contents relating to the location of the receiver.

20 Claims, 4 Drawing Sheets

(51) Int. Cl.
  *H04N 21/443* (2011.01)
  *H04N 21/45* (2011.01)
  *H04H 60/42* (2008.01)
  *H04H 60/51* (2008.01)
  *H04H 60/41* (2008.01)

(52) U.S. Cl.
  CPC ........... *H04N 5/50* (2013.01); *H04N 21/4432* (2013.01); *H04N 21/4524* (2013.01); *H04H 60/41* (2013.01)

(56) References Cited

OTHER PUBLICATIONS

Chinese Office Action dated Jun. 20, 2017, issued in Chinese Application No. 201480073380.X, filed Jan. 17, 2014.
Chinese Search Report dated Jun. 3, 2017, issued in Chinese Application No. 201480073380.X, filed Jan. 17, 2014.

* cited by examiner

RECEIVER OF TELEVISION AND/OR RADIO SIGNALS, CONFIGURED TO PREPARE ACCESS TO CONTENT INCLUDED IN SAID TELEVISION AND/OR RADIO SIGNALS BASED ON THE GEOGRAPHICAL LOCATION OF SAID RECEIVER

The present application claims priority from International Patent Application No. PCT/EP2014/050871 filed on Jan. 17, 2014, the disclosures of which is incorporated herein by reference in its entirety.

FIELD OF THE INVENTION

It is noted that citation or identification of any document in this application is not an admission that such document is available as prior art to the present invention.

The present invention refers to a receiver of television and/or radio signals, configured to prepare access to the content included in said television and/or radio signals based on the geographical location of said receiver.

In the following description it will be clear that by receiver apparatus of television signals it is meant a television equipped with its own screen, or a terrestrial type Set Top Box, able to receive and display television programs, in the latter case using for viewing an external screen of a monitor or a television, or a television/radio USB receiver for portable computers, or a personal computer card that can receive and decode the television signal. Similarly by receiver apparatus of radio signals it is meant any type of radio that is incorporated with other equipment or of the stand-alone type.

The method used by said television and/or radio signals receiver to implement the new features described below in the present description are also part of the invention.

As is known, many television and/or radio stations transmit contents of local interest, such as local news or radio news, weather or otherwise. These broadcasters are the so-called local or regional broadcasters that transmit in a predefined geographical area.

There are also broadcasters that normally operate at a national level and that at certain times provide content of local interest. An example of this type of broadcaster is the national German channel ARD that at certain times of the day broadcasts local programs:
- with the name SR for the local public radio-television broadcaster of the German state of Saarland,
- with the name HR for the local public radio-television broadcaster of the German state of Assia,
- with the name WDR for the local public radio-television broadcaster of the German state of Nordrhein-Westfalen,
- with the name BR for the local public radio-television broadcaster of the German state of Bavaria,
- or the Italian national channel "RAI 3" which broadcasts several times a day, a local television news program (TGR) for each different region of Italy.

This type of broadcaster is of particular importance when it is necessary to spread messages to the population in case of disasters (e.g. floods, hurricanes, earthquakes or similar). In this type of situation it is vital that only people affected by disasters receive, by way of local radio/television broadcasters, the most accurate information possible about the self-protection measures to be taken and/or refuge points to reach or the like.

A particularly critical scenario would be when a disaster occurs affecting two or more different areas (e.g. two or more neighboring regions) and wherein the population that resides in a first zone receives information from a television broadcaster and/or radio station that transmits information relating to a second zone.

In such hypothetical scenario, the inhabitants of the first zone might be advised to move to the north, while those of the second zone to move to the south, if the message with the north direction was received by the inhabitants of the second zone, instead of moving away from the disasters, they would move towards it, with obvious disastrous consequences.

In fact, a population residing in the vicinity of the border between two (or more) different areas that is normally able to receive local broadcasts of both areas, could cause, especially for people with poor cognitive abilities (e.g. the elderly, children and similar), an incorrect interpretation of information from such local broadcasters.

This situation is even more pronounced in the case in which the broadcaster providing the information transmits for the majority of the day content of national interest, rather than local, as it can be difficult for a user to understand if the receiver is tuned to the appropriate channel.

There are no known solutions in the prior art that solve the technical problems described above.

SUMMARY OF THE INVENTION

It is therefore the aim of the present invention to provide a receiver of television and/or radio signals, configured to prepare access to the content (for instance television and/or radio channels) included in said television and/or radio signals based on the geographical location of said receiver.

It is also an aim of the present invention to indicate a method used by said receiver of television and/or radio signals for implementing the new features described below in the present description.

These and other aims of the invention are achieved with a receiver of television and/or radio signals, configured to prepare access to the content included in said television and/or radio signals based on the geographical location of said receiver, where said location is determined according to the television and/or radio signals actually received and by geographic transmission information relating to television and/or radio services that transmit said signals, as claimed in the appended claims which form an integral part of the present description.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art.

Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
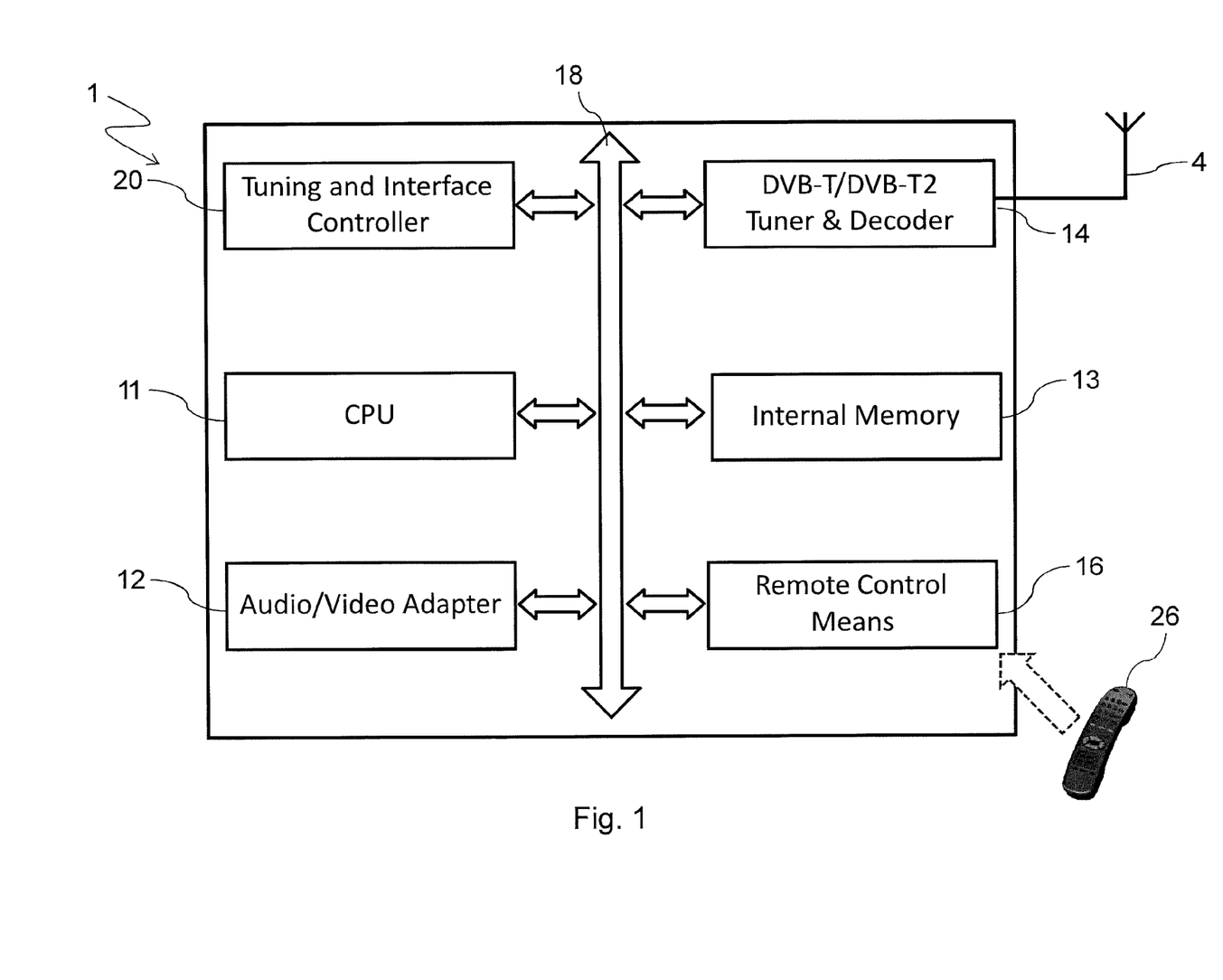
FIG. 1 illustrates a substantial part of a receiver of television and/or radio signals according to the invention.

With reference to FIG. 1, a receiver 1 of radio and/or television signals (hereinafter identified only with the term 'signals') is shown.

Such receiver 1 comprises memory means 13 in which are stored the geographic transmission information relating to services that transmit said signals. This information includes a plurality of elements, where each element includes data which allows to identify a geographic location of a particular television service that includes certain content. It should be noted that the term 'content' indicates a television/radio service, e.g. called 'service' in accordance with the terminology of the DVB standards, whereas in the terminology of the MPEG standards the same is referred to as 'program'.

Each content is identified by a name which is formed by a string of characters, wherein said character string is preferably equal to the name of the service transmitted using the DVB standard or the name of the radio station transmitted using the RDS standard.

The various data comprised in the geographical transmission information are structured so that the location of a certain service can be identified according to one or more of the following informational items: name of the service/broadcaster, the multiplex frequency, the multiplex identifier or the like. The structure of geographic transmission information will be described in more detail later in the following description.

The receiver 1 also includes the following elements:
- a central computing unit 11, also briefly indicated with the symbol CPU and/or with the term 'processing means';
- a audio/video controller 12 that comprises an audio playback unit (e.g. audio output interface) configured to generate an audio stream and/or a graphics processing unit (Graphics Processing Unit—GPU) configured to generate a video stream, wherein said audio/video stream is associated with a certain service and wherein said video stream is suitable to be displayed on an LCD panel and/or a plasma panel and/or a video projector and/or an external monitor to the receiver 1;
- memory means 13 containing, in addition to the above mentioned geographical information, the necessary instructions for the computing unit 11 to perform the steps of the method according to the invention, which will be better described in the course of this description;
- a tuning and interface controller 20 that allows for controlling and managing the operation of one or more tuners contained in said receiver 1;
- a communication bus 18 that allows the exchange of information between the central computing unit 11, the audio/video controller 12, the memory means 13, the tuning and interface controller 20 and the rest of the components contained in said receiver 1;
- remote control means 16 which allow the receiver 1 to receive commands from a remote control 26 and/or from another man-machine interface.

The memory means 13 may be of the ROM type (Read Only Memory) within which the programs (software) are written to be executed, or of the EPROM type (Erasable Programmable Read Only Memory), for instance of the re-writable type, apart from a memory RAM (Random Access Memory) in which the data elaborated by the CPU are momentarily written, or other similar type.

The signals receiver 1 may be a regular TV or a Smart-TV or a digital video recorder (Digital/Personal Video Recorder—DVR/PVR) or a set top box or other similar receiver or a radio receiver.

Moreover, the receiver 1 comprises means for receiving signals via radio which preferably comprise at least one tuner and decoder for digital terrestrial television 14, preferably according to the standard DVB-T and/or DVB-T2, connected to an antenna 4 for the reception of terrestrial television signals. The receiver 1 may also comprise an appropriate radio tuner for receiving FM radio signals (with analog audio modulation and RDS data) or DAB signals (with digital modulation).

The main embodiment will now be described, wherein means for receiving signals via radio include a tuner and decoder for digital terrestrial television 14. Similarly it may operate as a radio receiver.

When the receiver 1 is in a state of initialization or installation for its first operation, the central computing unit 11 executes a set of instructions that configure, preferably through the tuning and interface controller 20, the digital terrestrial television tuner and decoder 14 to perform a scan of all the frequency bands in which television and/or radio transmissions can be present. During the scan, the central computing unit 11 is also configured to store in the memory means 13 the tuning information relative to each receivable service in the area where the receiver is located 1.

The tuning information allows for configuring, preferably through the tuning and interface controller 20, the receiving means (in this case the tuner and decoder 14) for the reception of the contents included in the received radio-television signals; for each receivable content, such tuning information includes, inter alia, the channel frequency containing the multiplex within which the desired service is comprised.

When the receiver 1 is in an operating condition, the abovementioned tuning information allows the central processing unit 11 to quickly configure, upon request of a user (for example, by means of remote control), the receiving means, namely the tuner and decoder 14, so as to allow the reception of desired television and/or radio services.

The central computing unit 11 of the receiver 1 according to the invention is also configured to execute a set of instructions designed to estimate the location of the receiver 1 using both the tuning information (obtained when the receiver 1 is in the initialization-installation condition) and the geographical transmission information relating to the services of the received signals.

In this way it is possible to estimate the location of the receiver 1, without advantageously employing locating means such as a GPS or GLONASS.

A description will now be made, by way of example, of how the receiver can estimate its location and what information it uses to do so. In this example, it is assumed that the receiver 1 has stored in its memory means 13 the geographic transmission information of the table below, in the case of services available in Italy:

| Content_ID | Zone |
|---|---|
| 4rete | Piedmont |
| Toscana TV | Tuscany |

-continued

| Content_ID | Zone |
|---|---|
| Primocanale | Liguria |
| Telegenova | Liguria |

It should be noted that the column "Zone" contains, for each content, a literal description, preferably in the form of a string, of the area in which said content can be received (the so-called coverage area), each content is identified by a string in the column "Content ID" which is the name of the service according to the DVB standard.

In addition, it is also assumed that the receiver 1, having made such an automatic scan through the tuner and decoder 14 has stored, preferably in the memory means 13, the tuning information in the following table

| Content_ID | Frequency (MHz) |
|---|---|
| Rai 1 | 674,000 |
| Rai 2 | 674,000 |
| Rai 3 | 674,000 |
| Primocanale | 658,000 |
| Telegenova | 623.250 |
| Toscana TV | 586,000 |

To determine its location, the receiver 1 can for example select the lines of geographic transmission information, memorized in said memory means 13 that are compatible with the detected tuning information. In this way, the receiver 1 is able to determine its location by selecting the area that has the largest number of geographic information compatible with the tuning information.

If the tuning information and the geographic transmission information are stored in a relational database containing two relations (GeoInfo and TuningInfo) that are structured as the tables above, the receiver can determine its location 1 by performing the operation as just described by way of running the following SQL query:

```
SELECT TOP 1 tmp.Zona
FROM ( SELECT count (*) AS num_received_channels, ti.Zona
    FROM GeoInfo AS gi, TuningInfo AS ti
    WHERE gi. Content_ID = ti . Content_ID
    GROUP BY ti.Zona ) AS tmp
ORDER BY tmp.num_received_channels DESC;
```

The execution of this query, using the information from the tables above, would result in the string 'Liguria'.

At this point it is possible to prepare access to the receivable contents, using the tuning information, in the most appropriate manner based on the determined location. In this example, it would be possible to eliminate the tuning information relative to the content having as a Content_ID the alphanumeric string 'TOSCANA TV' or make accessible the tuning information relating to that content through another list or storing the same at the end of the list of received services.

Further details concerning the preparation phase of the information is provided later in the present description.

The accuracy in determining the location can be advantageously increased by adding to the tuning information the geographical information relative to the transmitter that uses the frequency (of the multiplex) from which a certain content is received. This also allows for taking advantage of national wide broadcasters that transmit content of local/regional interest.

In fact, this type of broadcaster are not always able to transmit in DVB-T using the isofrequency technique (SFN—Single-Frequency Network), but, in order to avoid problems in areas of overlap of the transmitted signal by two or more repeaters, they are obliged to transmit using the multi-frequency technique (MFN—Multi-Frequency Network). It therefore results in being possible to also advantageously exploit the information relating to the transmission frequencies so as to improve the accuracy of locating the receiver 1; such precision can be further increased by using the combination of the frequencies with the geographic transmission information that, for each content, also includes the geographic location of the transmitter which transmits said content.

Below are some of the content of local/regional interest broadcast by national television broadcasters in Europe via digital terrestrial television, which can be exploited in order to help increase the accuracy in estimating the receiver's location 1:
- the TGR broadcast by RAI on RAI 3 in all twenty Italian regions;
- the local news broadcast on NDR Fernsehen in the four areas of NDR in Germany;
- regional programs broadcast on France 3 in France by France Televisions;
- the news program Telenoticies comarques broadcast by Televisio de Catalunya in the four Catalan provinces of Spain;
- programs broadcast on BBC ONE by the BBC in England.

In the example below, the geographical transmission information also includes, for each content, the channel frequency where the multiplex is placed the and the geographical location of the transmitter of the content.

In order to illustrate this embodiment of the invention, it is assumed that the receiver 1 contains in its memory means 13, the geographical transmission information in the following table:

| Content_ID | Frequency (MHz) | Transmitter_Location | Zone |
|---|---|---|---|
| Rai 1 | 482,000 | Turin | Piedmont |
| Rai 2 | 482,000 | Turin | Piedmont |
| Rai 3 | 482,000 | Turin | Piedmont |
| Rai1 | 674,000 | Genoa | Liguria |
| Rai 2 | 674,000 | Genoa | Liguria |
| Rai 3 | 674,000 | Genoa | Liguria |
| 4rete | 498,000 | Turin | Piedmont |
| Toscana TV | 586 000 | Massa Carrara | Tuscany |
| Primocanale | 658,000 | Genoa | Liguria |
| Telegenova | 538,000 | Genoa | Liguria |

It should be noted that the column "Transmitter_Location" may also contain, rather than the literal description of the location, a pair of values that represent the geographic coordinates (latitude, longitude) relative to the location of the transmitter.

In addition, it is also assumed that the receiver 1, after scanning by way of the tuner and decoder 14, has stored, preferably in the memory means 13, the tuning information in the following table:

| Content_ID | Frequency (MHz) |
|---|---|
| Rai 1 | 674,000 |
| Rai 2 | 674,000 |
| Rai 3 | 674,000 |
| Primocanale | 658,000 |

| Content_ID | Frequency (MHz) |
|---|---|
| Telegenova | 623,250 |
| Toscana TV | 586,000 |

As with the previous example, the receiver determines its location by selecting the rows of geographic transmission information that are compatible with the detected tuning information. After that, the receiver 1 can group together the selected geographical information, based on the area or location. In this way, the receiver 1 is able to determine its location by selecting the area or the location which has the largest number of geographic information compatible with the tuning information generated by the receiver 1 itself.

If the tuning information and the geographic transmission information are stored in a relational database containing two relations (GeoInfo and TuningInfo) that are structured as per the tables above, the receiver 1 can determine its location by carrying out the operation just described above by running the following SQL query:

```
SELECT TOP 1 tmp.Zona
FROM ( SELECT count (*) AS num_received_channels,
        ti.Transmitter_Location
    FROM GeoInfo AS gi, TuningInfo AS ti
    WHERE gi . Content_ID = ti . Content_ID AND
        gi.Frequency = ti.Frequency
    GROUP BY ti.Transmitter_Location ) AS tmp
ORDER BY tmp.num_received_channels DESC;
```

The execution of this query, using the information in the above tables, would result in the string 'Genoa', thus allowing to determine the location of receiver 1 with greater accuracy than the previous example.

At this point, the receiver 1 can prepare to access the receivable content arranging the tuning information in an appropriate way according to the determined location. As in the previous example, it is possible to eliminate the tuning information related to the content having the Content_ID relative to the alphanumeric string 'Toscana TV' or move the content to a separate list, or memorize the same at the end of the list of receivable services.

It is however possible for the person skilled in the art to determine the location of the receiver 1 by using a strategy that uses the tuning information and the geographical transmission information in a manner different from that just described above, without however departing from the teachings of the present invention.

More in general, a requirement for determining the location of the receiver 1, using the strategy described above, is that the tuning information should be comparable with the geographical transmission information, namely it should be possible to understand, by example comparing, in some way, one or more of the respective fields of information, which elements of geographical transmission information corresponds to certain elements of tuning information generated/inserted by/in the receiver 1.

Once the location of the receiver 1 has been estimated, it is possible to prepare access to content based on said location.

An example of preparing access to content is the elimination of tuning information that allows access to content that does not transmit information relevant to the area where the receiver 1 is located.

As an alternative to the elimination of the tuning information as mentioned above, it is possible to organize the information so as that the contents are not immediately accessible to the user, for example by making it possible to access the said tuning information, which is related to the content not relevant to the area where the receiver 1 is located, only through a secondary service list. In this way, in the primary service list only the content would be present that transmit information of local interest.

The geographic transmission information has a very important role in ensuring correct preparation of the tuning information. For this purpose, such geographical transmission information can be updated via radio, for example periodically tuning the tuner and decoder 14 to a particular service on which such information are transmitted (for example, using the MHP or another data transmission system associated to the television service). Alternatively or in combination to the solution just described, such geographical information can be received and, therefore updated through a data network accessible by means of a network interface (not illustrated in the attached figures), for example periodically accessing a web service (Web Service) that provides this information in a binary format readily usable by the receiver 1.

In summary, the receiver 1 performs a method for preparing access to the content included in the radio and television signals received by said receiver 1, wherein said method comprises the following steps:
  a. generate the tuning information relating to received radio and/or television signals, wherein said tuning information is able to configure the receiver 1 for the reception of the content of received radio and/or television signals,
  b. determine the geographical location of the receiver 1 according to the tuning information generated in the course of step a. and/or the geographic transmission information that includes the geographic locations of transmitters that transmit signals that are received by the receiver 1,
  c. prepare access to the tuning information generated during step a. based on the geographical location of the receiver 1 determined in step b. in order to arrange access to content regarding the location of the receiver 1.

To make possible the implementation of the method according to the invention by the receiver of radio and/or television signals 1, said method can be encoded in a computer program using a programming language, such as C/C++, C #, Visual Basic, Fortran or similar. As a total or partial alternative for the implementation by software, part of the method may be performed by specially developed circuitry and/or programmable hardware, for example a CPLD, FPGA or other.

Figure 2:
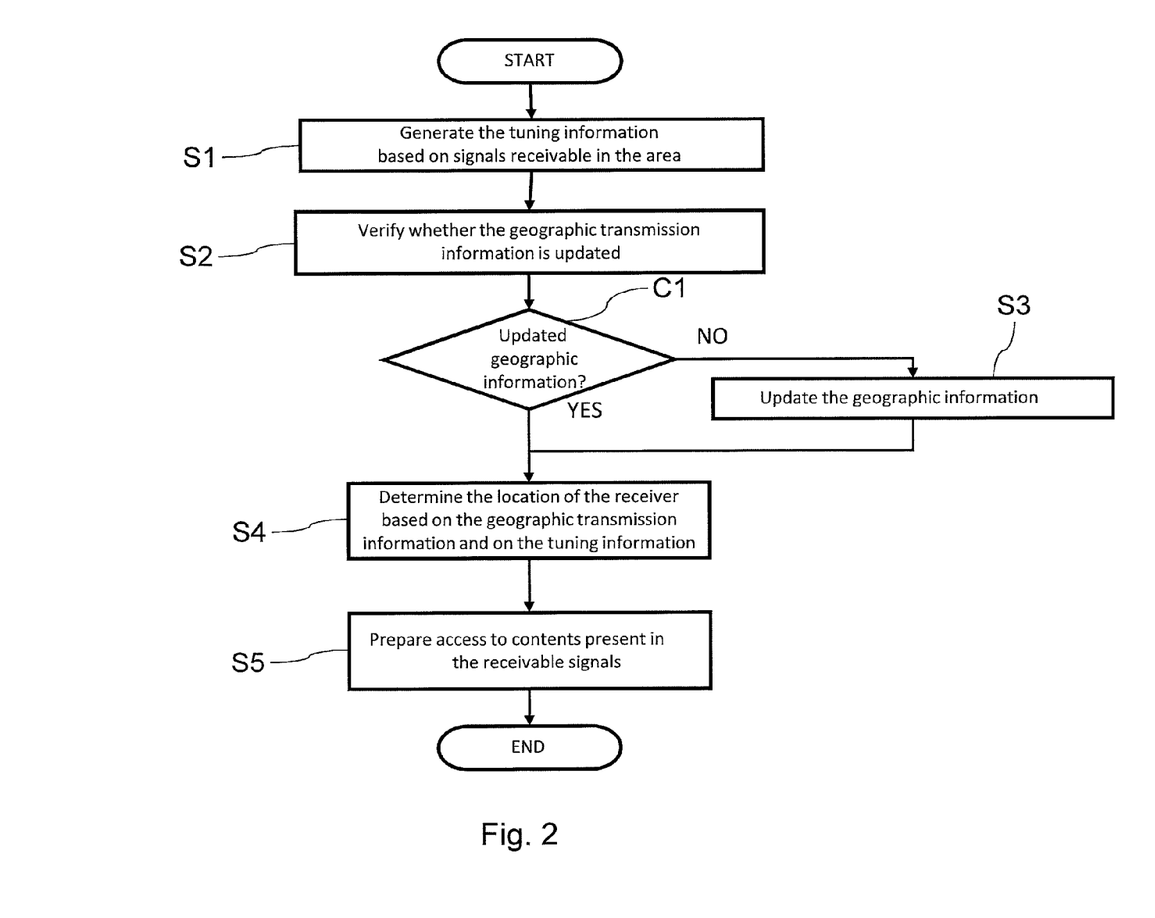
FIG. 2 illustrates a flow diagram of an implementation of the method according to the invention used by the receiver of FIG. 1.

Also with reference to FIG. 2, an implementation of the method described above and applied to the receiver 1 includes the following states:
  a search state of the received signals S1, during which the receiver 1 operates step a. of the method according to the invention, allowing the radio and/or receiver 1, the generation of an access list that allows access to the contents included in the received signals;
  a geographic information verification state S2, during which the receiver first checks if the geographical transmission information are updated;
  a geographic information update state S3, during which the receiver 1 updates the geographic transmission information;

a location determination state S4, during which the receiver 1 operates step b. of the method according to the invention, allowing the receiver 1 to determine (or estimate) its current geographic location by using the tuning information, which is generated during the permanence of the receiver in the state S1, and to geographical transmission information, which is verified and updated as required during the permanence of receiver 1 in the states S2 and S3;

an access content preparation state S5, during which the receiver 1 operates step c. of the method according to the invention, preparing access to the tuning information based on the geographical location (or estimate thereof) determined during the permanence of the receiver 1 in the state S4, in order to allow the user rapid selection to the contents of local interest relative to the location of the receiver 1.

When the receiver enters a state of initialization/installation (for example, when the search for services is initiated or the receiver 1 is turned on for the first time), the method described above is performed and the receiver 1 enters state S1.

During its permanence in this state S1, the receiver 1 generates tuning information, for example by using the automatic scanning feature that is present today in the majority of radio and television receivers, the receiver 1 then switches to S2.

During its permanence in state S2, the receiver 1 checks whether the geographic transmission information is updated, for example by calculating a summary (hash) of the transmission information present in the memory means 13 and by comparing the computed hash with the one published by a web service or by means of a radio service update, where said service is responsible for the transmission of updated geographic transmission information. If the information is not updated, the receiver 1 enters state S3, otherwise the receiver 1 enters state S4.

During its permanence in state S3, the receiver 1 downloads from a network, to which it is connected by way of the network interface, updated geographic transmission information and proceeds to update the information already present in the memory means 13. Alternatively, or in combination with what has just been described, the receiver 1 may update such information waiting for a more recently updated version of the radio service to be transmitted. After updating the geographic transmission information, the receiver enters state S4.

During its permanence in state S4, the receiver 1 determines its location by running step b. of the method according to the invention, after which the receiver 1 enters state S5.

During its permanence in state S5, the receiver 1 prepares access to the content included in the received signals, preferably facilitating access to the contents of local interest based on the location of receiver 1, for example by deleting or moving to a secondary list the content of local interest that is related to a geographical area other than that in which the receiver 1 is located.

When the receiver 1 exits state S5, ending the execution of the method according to the invention, the receiver 1 is configured to access the contents of local interest relating to the location of the receiver 1.

Figure 3:
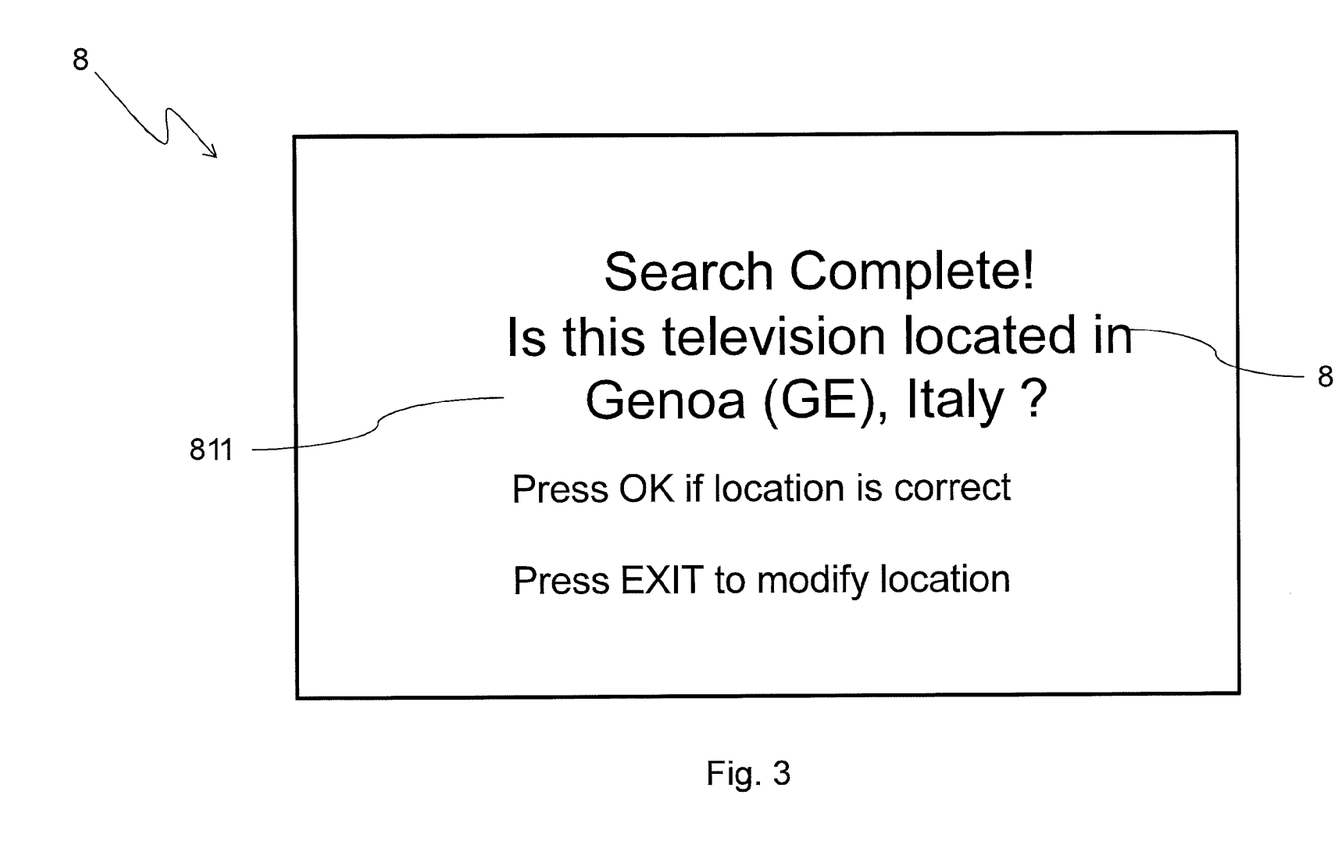
FIG. 3 shows a confirmation screen of the location generated by the receiver of FIG. 1.

Also with reference to FIG. 3, the receiver 1, before passing from state S4 to state S5, can generate, through the audio/video controller 12, a location confirmation screen 8. This screen 8 confirming the geographic location includes a message 81 that informs the user of the receiver 1 that the generation of the tuning information is complete and that the receiver 1 has determined its geographical location. In fact, said message 81 includes a string of a geographic location 811 which, preferably through a string of characters (e.g. 'Genoa', 'Turin', 'Massa Carrara'), expressing the geographical location determined during step b. (step S4) of the method according to the invention. In addition, this message 8 requires the user to confirm whether the specific geographical location is correct or not, which can be done, for instance, by using the remote control unit 26 which includes the buttons 'OK' and 'EXIT'.

In the case wherein the 'OK' button is pressed, the receiver 1 switches to state S5, while if the key 'EXIT' is pressed then the receiver 1 shows a screen of geographical location (not shown in the drawings) that allows the user to correct (or specify more precisely) the geographical location determined by the receiver 1. In order to advantageously facilitate the correction of the geographical location, the geographical location screen may comprise a map (for example similar to that of Google Maps, Bing Maps or other) on which is represented by means of an icon the position initially determined by the receiver 1, where such icon can be moved to the current location of the receiver 1, preferably by way of the remote control 26, for example using the 'ARROW UP/DOWN/LEFT/RIGHT' buttons included on the remote control.

Figure 4:
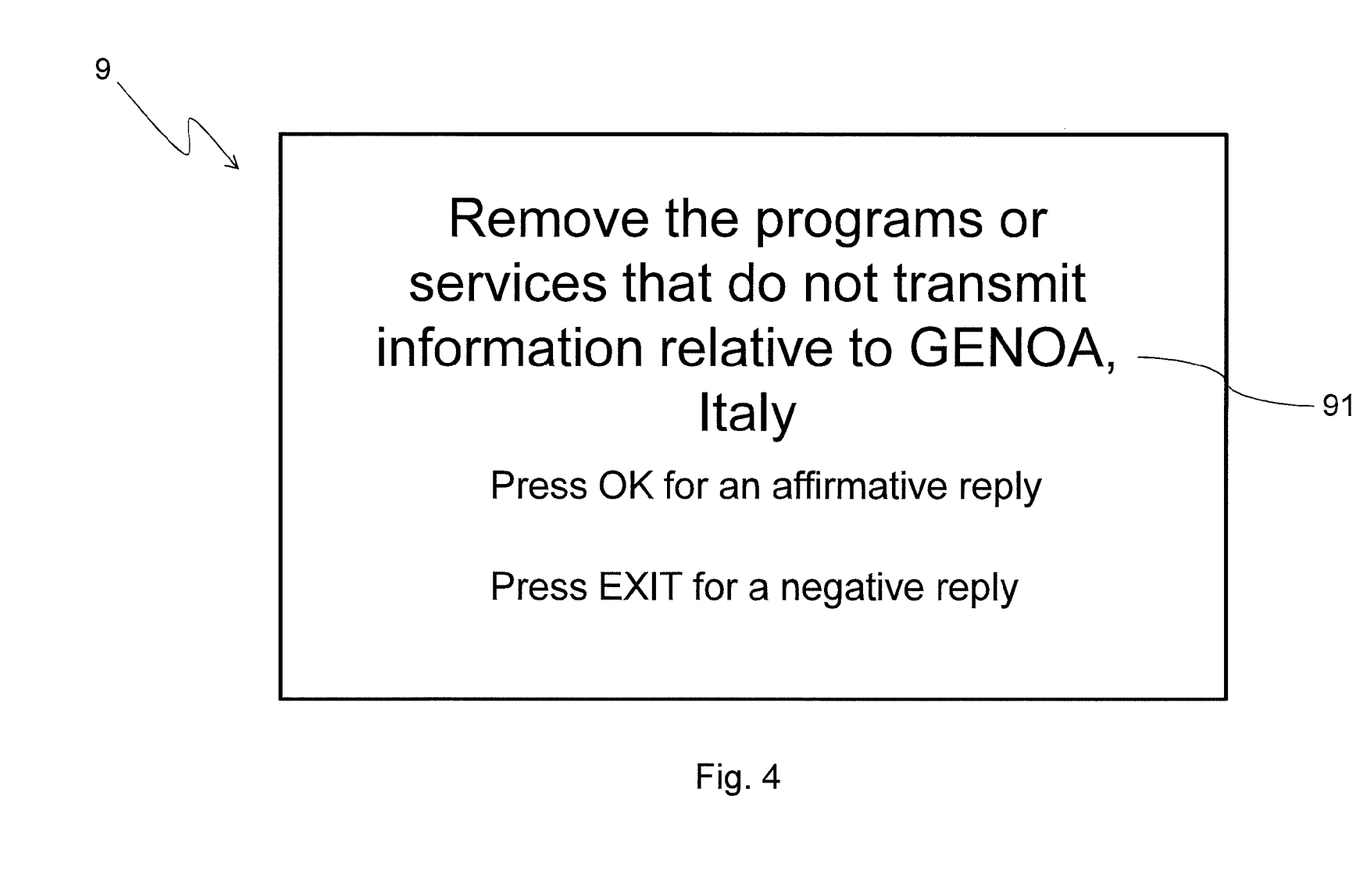
FIG. 4 shows a confirmation screen of the modification of the content generated by the receiver of FIG. 1.

Also with reference to FIG. 4, the receiver 1, when entering state S5, can generate the confirmation deletion/moving content screen 9, wherein said screen 9 includes a message that prompts the user to decide whether or not to delete the content (TV or radio services) that transmit information of local interest, but which are not relevant to the location where the receiver 1 is located. At this point, the user can confirm whether or not to proceed with the cancellation and/or moving of such content, for example using the 'OK' and 'EXIT' buttons on the remote control.

In a variation of the invention, if the user presses the 'OK' button, the receiver 1 will remove all tuning information relative to the contents that convey information of local interest, but which, however, do not relate to the geographical location in which the receiver 1 is located. In the case where the 'EXIT' button is pressed, such tuning information is placed in a secondary access list, e.g. a list of access to content (services) that are not immediately accessible to the user, in other words the central calculation unit 11 is also configured to prepare access to the tuning information so that the content related to the geographical location of receiver 1 is directly or immediately accessible, while the contents that are not related to the location of receiver 1 are not directly accessible or are accessible in a second mode.

It should be noted, finally, that the method according to the invention can be performed on a request made by a user, for example by means of a remote control, for example, after the receiver 1 has performed the automatic search of available content in a specific area.

Numerous variants are therefore possible, without departing from the principles of novelty inherent in the inventive idea. It is clear to the expert that, in the practical implementation, the forms of the illustrated details may be different and that they can be replaced with technically equivalent elements. It is therefore easily understood that the present invention is not limited to the illustrative examples described, but is susceptible to various modifications, improvements, substitution of parts and equivalent elements without departing from the basic inventive idea, as specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A receiver of radio and/or television signals comprising contents, where said signals are transmitted via radio transmission by transmitters and are received by said receiver, the receiver comprising:
   a reception means for receiving signals via radio transmission, which, through tuning information, is configured for the reception of the contents of the received radio and/or television signals;
   a memory means containing at least geographic transmission information that includes geographical areas of coverage of the transmitters, which transmit the signals received by the reception means, wherein said geographical transmission information is comparable with the tuning information; and
   a central computing unit that is configured to:
   determine a geographical location of the receiver by selecting an area of coverage that has the largest number of the geographic transmission information that are compatible with the tuning information; and
   prepare access to the tuning information based on the determined geographical location of the receiver in order to organize access to contents relating to the geographical location of the receiver.

2. The receiver according to claim 1; wherein the tuning information comprise, for each received content, at least one piece of information selected from the group consisting of a service name, a radio station name, and a radio frequency value on which said content is received.

3. The receiver according to claim 2; wherein the geographical transmission information include, for each content, a geographical area relative to the name of the service, the name of the radio station, or both.

4. The receiver according to claim 3; wherein the tuning information comprise, for each received content, a channel frequency on which a multiplex is received which contains said content.

5. The receiver according to claim 4; wherein the geographical transmission information include, for each content, a channel frequency in which the multiplex is inserted that contains said content.

6. The receiver according to claim 5; wherein the geographical transmission information include, for each content, a geographical location of the transmitter that transmits said content.

7. The receiver according to claim 1; wherein the central computing unit is also configured to prepare access to the tuning information so that the content related to the geographical location of the receiver is accessible by means of a first access list, while the contents that are not related to the geographical location of the receiver are accessible by means of a second access list, where the first access list is available to the receiver before the second access list.

8. The receiver according to claim 1; wherein the central computing unit is also configured to prepare access to the tuning information eliminating non-geographical-location-related tuning information relative to the contents that do not relate to the geographical location of the receiver.

9. The receiver according to claim 1; wherein the central computing unit is configured to generate a location confirmation screen that allows a user of said receiver, to confirm the determined geographical location of the receiver.

10. The receiver according to claim 1; wherein the central computing unit is configured to generate a geographic location screen that allows a user of said receiver, to correct the determined geographical location of the receiver.

11. A method for preparing access to content included in radio and/or television signals received by a receiver, the method comprising the steps of:
   (a) generating tuning information relative to said received radio and/or television signals, wherein said tuning information is able to configure the receiver for the reception of the content of the received radio and/or television signals;
   (b) determining a geographical location of the receiver according to geographic transmission information, which includes geographical coverage areas of transmitters that transmit the signals that are received by the receiver, wherein said geographical transmission information is comparable with the tuning information, the geographical location of the receiver being determined by selecting a geographical coverage area that has the largest number of the geographic transmission information that are compatible with the tuning information; and
   (c) preparing access to the tuning information generated during step (a) based on the geographical location of the receiver determined in step (b) in order to arrange access to content relative to the location of the receiver.

12. The method according to claim 11; wherein the tuning information comprise, for each received content, a service name, a radio station, or both.

13. The method according to claim 12; wherein the geographical transmission information include, for each content, a service name, a radio station or both.

14. The method according to claim 13; wherein the tuning information comprise, for each received content, the channel frequency on which a multiplex is received which contains said content.

15. The method according to claim 14; wherein the geographical transmission information include, for each content, the channel frequency in which the multiplex is inserted that contains said content.

16. The method according to claim 15; wherein the geographical transmission information include, for each content, a geographical location of the transmitter that transmits said content.

17. The method according to claim 11; wherein, during step (a), tuning information is automatically generated based on the signals received by said receiver.

18. The method according to claim 11; wherein, during step (c), tuning information is organized so as that the content relating to the geographical location of the receiver is accessible by means of a first access list, while the contents that are not related to the location of the receiver are accessible by means of a second access list, wherein said first access list can be accessed by the receiver before the second access list.

19. The method according to claim 11; wherein, during step (c), tuning information relating to content which is not relative to the location of the receiver is eliminated.

20. A non-transitory computer readable medium comprising software code including instructions that implement the steps of the method according to claim 11.

* * * * *